US008774089B2

(12) United States Patent
Nuno et al.

(10) Patent No.: US 8,774,089 B2
(45) Date of Patent: Jul. 8, 2014

(54) WIRELESS TERMINAL CALL METHOD AND WIRELESS ACCESS SYSTEM CAPABLE OF GREATLY REDUCING STANDBY POWER CONSUMPTION OF WIRELESS TERMINALS IN A CALL STANDBY STATE WITHOUT INCREASING CALL DELAY TIME

(75) Inventors: Fusao Nuno, Yokosuka (JP); Yoshitaka Shimizu, Yokosuka (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 957 days.

(21) Appl. No.: 12/933,595

(22) PCT Filed: Mar. 24, 2009

(86) PCT No.: PCT/JP2009/055812
§ 371 (c)(1),
(2), (4) Date: Nov. 2, 2010

(87) PCT Pub. No.: WO2009/119575
PCT Pub. Date: Oct. 1, 2009

(65) Prior Publication Data
US 2011/0038317 A1 Feb. 17, 2011

(30) Foreign Application Priority Data

Mar. 24, 2008 (JP) .............................. P 2008-076498

(51) Int. Cl.
*H04W 4/00* (2009.01)
(52) U.S. Cl.
USPC ........... 370/328; 370/329; 370/330; 370/337; 370/338; 370/339; 455/517; 455/219; 455/225; 455/551; 455/560
(58) Field of Classification Search
USPC ................. 370/338, 337, 339, 328, 329, 330; 455/517, 219, 225, 551, 560
See application file for complete search history.

(56) References Cited

U.S. PATENT DOCUMENTS 6,622,251 B1 * 9/2003 Lindskog et al. ............. 713/300
6,832,094 B2 12/2004 Butler et al.
(Continued)

FOREIGN PATENT DOCUMENTS

CN 1354939 A 6/2002
CN 101141788 A 3/2008
(Continued)

OTHER PUBLICATIONS

First Office Action, Chinese Patent Application No. 200980109288.3, Dec. 3, 2012.
(Continued)

*Primary Examiner* — Brandon Renner
*Assistant Examiner* — Abdelnabi Musa
(74) *Attorney, Agent, or Firm* — Harness, Dickey & Pierce, P.L.C.

(57) ABSTRACT

A wireless terminal receives a first broadcast signal transmitted from a wireless base station; detects whether a part of a wireless terminal ID of the own wireless terminal is included in the first broadcast signal received in the broadcast signal reception or not and determines that the second broadcast signal is to be continuously received when the part of the wireless terminal ID is included; and receives the second broadcast signal when it is determined in the broadcast signal determination that the second broadcast signal is to be received, stops receiving data transmitted from the wireless base station when assignment information to be transmitted to the own wireless terminal is not present in the received second broadcast signal, and receives data transmitted from the wireless base station to the own wireless terminal based on the information on the assignment position of the wireless slot included in the second broadcast signal when the assignment information to be transmitted to the own wireless terminal is present in the received second broadcast signal.

13 Claims, 14 Drawing Sheets

(56) References Cited

U.S. PATENT DOCUMENTS

| | | |
|---|---|---|
| 7,054,630 B2 * | 5/2006 | Nagpal et al. .................. 455/434 |
| 2006/0094450 A1 * | 5/2006 | Park et al. ...................... 455/458 |
| 2007/0218889 A1 * | 9/2007 | Zhang et al. ................ 455/422.1 |
| 2009/0034445 A1 * | 2/2009 | Prakash et al. ................. 370/311 |

FOREIGN PATENT DOCUMENTS

| JP | 2002-501706 | 1/2002 |
|---|---|---|
| WO | WO-98/54919 A2 | 12/1998 |

OTHER PUBLICATIONS

High-Speed Wireless Access Network (HiSWANa) Standard Specification, ARIB STD-T702.0 Edition Nov. 27, 2002, 2.0 revision, Association of Radio Industries and Businesses, with partial English translation thereof.

* cited by examiner

WIRELESS TERMINAL CALL METHOD AND WIRELESS ACCESS SYSTEM CAPABLE OF GREATLY REDUCING STANDBY POWER CONSUMPTION OF WIRELESS TERMINALS IN A CALL STANDBY STATE WITHOUT INCREASING CALL DELAY TIME

TECHNICAL FIELD

The present invention relates to a wireless terminal call method in a wireless access network, and more particularly, to a wireless terminal call method and a wireless access system capable of greatly reducing standby power consumption of wireless terminals in a call standby state without increasing the call delay time.

This application claims priority to and the benefit of Japanese Patent Applications No. 2008-076498 filed on Mar. 24, 2008, the content of which is incorporated herein by reference.

BACKGROUND ART

In a wireless access network, wireless terminals in a call standby state periodically receive a first broadcast signal for broadcasting system information. When calling the wireless terminal, a wireless base station sets a call bit (one bit) in the first broadcast signal. Upon receipt of the first broadcast signal in which the call bit is set, the wireless terminal receives a second broadcast signal subsequent to the first broadcast signal. Burst assignment information to be transmitted to each wireless terminal is notified each wireless terminal of through the second broadcast signal.

The wireless terminal having received the second broadcast signal confirms the burst assignment information in the second broadcast signal. When there is an assignment for the own wireless terminal, the wireless terminal transitions from the call standby state to a communication state to communicate with the wireless base station. On the other hand, when there is not an assignment, the wireless terminal remains in the call standby state (see Non-Patent Document 1).

In the above-described conventional method, all the wireless terminals in the call standby state receive the second broadcast signal, even when a specific wireless terminal is called. This has a problem in that since the uncalled wireless terminals also receive the second broadcast signal, the uncalled wireless terminals consume power when receiving the second broadcast signal, thus shortening the battery lifetime of the wireless terminals. This problem becomes worse with an increase in the number of wireless terminals allowed in one wireless base station. For this reason, a big problem may occur in a multi-access wireless access system covering several tens of thousands of wireless terminals with one wireless base station.

Non-Patent Document 1: High-Speed Wireless Access Network (HiSWANa) Standard Specification, ARIB STD-T702.0 Edition, Nov. 27, 2002, 2.0 revision, Association of Radio Industries and Businesses

DISCLOSURE OF INVENTION

Problem to be Solved by the Invention

The present invention has been achieved in view of the above circumstances, and it is an object of the present invention to provide a wireless terminal call method and a wireless access system capable of greatly reducing standby power consumption of wireless terminals in a call standby state without increasing the call delay time, to lengthen a lifetime of the batteries of the wireless terminals.

Means for Solving the Problem (1) The present invention has been achieved to resolve the foregoing problems. An aspect of the present invention provides a wireless terminal call method in which a plurality of wireless terminals each having a unique ID share a wireless frame including a plurality of wireless slots and a wireless base station calls the wireless terminals using a broadcast slot of the wireless frame, the wireless terminal call method including: generating, by the wireless base station, a first broadcast signal including parts of wireless terminal IDs of the wireless terminals to be called and a second broadcast signal including information on assignment positions of the wireless slots for the wireless terminals to be called; generating, by the wireless base station, a wireless frame including the first broadcast signal and the second broadcast signal subsequent to the first broadcast signal in the broadcast slot; and transmitting, by the wireless base station, the wireless frame to the wireless terminals, receiving, by the wireless terminals, the first broadcast signal transmitted from the wireless base station; detecting, by the wireless terminals, whether the part of the wireless terminal ID of the own wireless terminal is included in the first broadcast signal received in the broadcast signal receiving process or not and determining that the second broadcast signal is to be continuously received when the part of the wireless terminal ID is included; and receiving, by the wireless terminals, the second broadcast signal when it is determined in the broadcast signal determining process that the second broadcast signal is to be received, stopping receiving data transmitted from the wireless base station when assignment information to be transmitted to the own wireless terminal is not present in the received second broadcast signal, and receiving data transmitted from the wireless base station to the own wireless terminal based on the information on the assignment position of the wireless slot included in the second broadcast signal when the assignment information to be transmitted to the own wireless terminal is present in the received second broadcast signal.

(2) In the wireless terminal call method according to the aspect of the present invention, the wireless terminal call method may further include: dividing, by the wireless base station, the wireless terminals into a plurality of groups and setting a super frame including a plurality of the wireless frames; presetting, by the wireless base station, the corresponding wireless frame from the plurality of wireless frames in the super frame for each group, and receiving, by the wireless terminal, the first broadcast signal or the first and second broadcast signals in the preset wireless frame.

Accordingly, the wireless terminals can intermittently receive the signal, thereby greatly reducing the standby power consumption of wireless terminals in the call standby state. Therefore, a lifetime of the battery of the wireless terminals can be lengthened.

(3) In the wireless terminal call method according to the aspect of the present invention, the first broadcast signal may include call information having a fixed length and including classification information and wireless terminal ID information, the classification information may be at least one of the number of partial ID patterns included in the wireless terminal ID information, lengths of the partial Ill patterns, and information associated with the number and lengths of the partial ID patterns, the wireless terminal ID information may indicate the plurality of partial ID patterns, and the partial ID pattern may indicate part or all of the wireless terminal ID of the wireless terminals to be called.

Accordingly, the first broadcast signal can have a fixed length, thereby simplifying the reception process in the wireless terminal and reducing the overhead.

(4) In the wireless terminal call method according to the aspect of the present invention, the number of wireless terminals to be called may be used as the classification information.

(5) In the wireless terminal call method according to the aspect of the present invention, a bit length of one partial ID pattern in the wireless terminal ID information may vary with the number of partial ID patterns included in the wireless terminal ID information.

Accordingly, the first broadcast signal can have a fixed length irrespective of the number of wireless terminals to be called.

(6) In the wireless terminal call method according to the aspect of the present invention, ID information of the wireless terminal designated in the wireless terminal ID information may be represented in a bit pattern for each wireless terminal to be called, and the bit pattern may be a bit pattern of a plurality of bits which are all or part of the ID of the wireless terminal to be called, the bit pattern being a bit pattern corresponding to a bit length of one partial ID pattern designated in the wireless terminal ID information.

Accordingly, it is possible to call wireless terminals more than the number of bit patterns (partial ID patterns) designated by the wireless terminal ID information.

(7) In the wireless terminal call method according to the aspect of the present invention, when the bit patterns of the plurality of bits of the IDs of the plurality of wireless terminals among the wireless terminals to be called are common in a range of the bit length of one partial ID pattern designated in the wireless terminal ID information, the wireless base station may regard the plurality of wireless terminals having the common bit pattern as one wireless terminal to generate the wireless terminal ID information.

Accordingly, it is possible to call the wireless terminals more than the number of bit patterns (partial ID patterns) designated by the wireless terminal ID information.

(8) Another aspect of the present invention provides a wireless access system in which a plurality of wireless terminals each having a unique ID share a wireless frame including a plurality of wireless slots and a wireless base station calls the wireless terminals using a broadcast slot of the wireless frame, wherein the wireless base station includes: a broadcast signal generation unit which generates a first broadcast signal including parts of wireless terminal IDs of the wireless terminals to be called and a second broadcast signal including information on assignment positions of the wireless slots for the wireless terminals to be called; a wireless frame generation unit which generates a wireless frame including the first broadcast signal and the second broadcast signal subsequent to the first broadcast signal in the broadcast slot; and a first transceiver unit which transmits the wireless frame to the wireless terminals and receives wireless signals transmitted from the wireless terminals, and wherein the wireless terminals includes: a second transceiver unit which receives the first broadcast signal transmitted from the first transceiver unit and transmits the wireless signal to the wireless base station; a broadcast signal determination unit which detects whether the part of the wireless terminal ID of the own wireless terminal is included in the first broadcast signal received by the second transceiver unit or not and determines that the second broadcast signal is to be continuously received when the part of the wireless terminal ID is included; a broadcast signal reception unit which receives the second broadcast signal subsequent to the first broadcast signal when the broadcast signal determination unit determines that the second broadcast signal is to be received; and a data reception unit which stops receiving data transmitted from the wireless base station when assignment information to be transmitted to the own wireless terminal is not present in the received second broadcast signal, and receives data transmitted from the wireless base station to the own wireless terminal based on information on the assignment position of the wireless slot included in the second broadcast signal when the assignment information to be transmitted to the own wireless terminal is present in the received second broadcast signal.

Accordingly, wireless terminals receiving the second broadcast signal can be restricted by the first broadcast signal, thereby greatly reducing the standby power consumption of the wireless terminals in the call standby state without increasing the call delay time. Therefore, a lifetime of the battery of the wireless terminals can be lengthened.

Effect of the Invention

In the wireless terminal call method according to the present invention, the first broadcast signal transmitted from the wireless base station includes part of the wireless terminal ID for identifying a called wireless terminal. The wireless terminals receive the first broadcast signal, and receive the second broadcast signal when the first broadcast signal includes the part of the wireless terminal ID of the own wireless terminal.

Accordingly, timing at which data is actually received is detected so that wireless terminals excluding a called wireless terminal do not receive the second broadcast signal.

Accordingly, wireless terminals receiving the second broadcast signal can be restricted by the first broadcast signal, thereby greatly reducing the standby power consumption of the wireless terminals in the call standby state without increasing the call delay time. Therefore, a lifetime of the battery of the wireless terminals can be lengthened.

REFERENCE SYMBOLS

Figure 1:
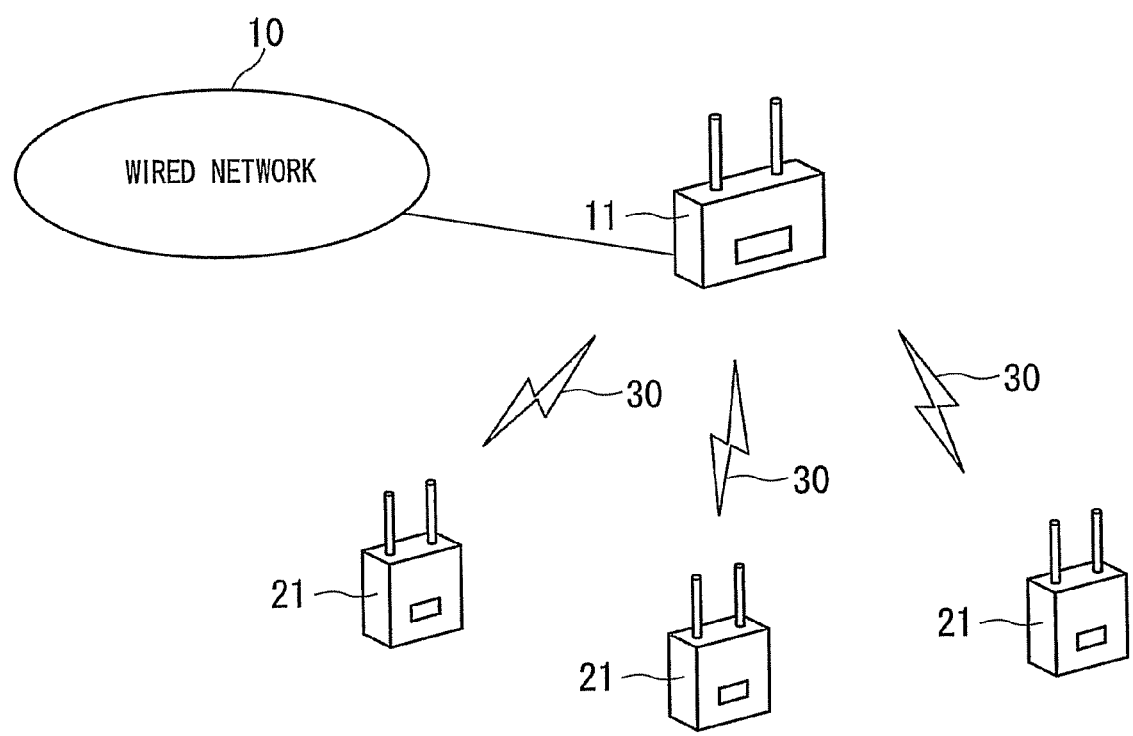
FIG. 1 is a diagram illustrating the configuration of a wireless access system according to a first embodiment of the present invention.

10: WIRED NETWORK
11: WIRELESS BASE STATION
12: CONTROL UNIT OF WIRELESS BASE STATION
13: BROADCAST SIGNAL GENERATION UNIT
14: MAC FRAME GENERATION UNIT
15: TRANSCEIVER UNIT
16: DATABASE
21: WIRELESS TERMINAL
22: CONTROL UNIT OF WIRELESS TERMINAL
23: TRANSCEIVER UNIT
24: BROADCAST SIGNAL DETERMINATION UNIT
25: BROADCAST SIGNAL RECEPTION UNIT
26: DATA RECEPTION UNIT

Best Mode for Carrying Out the Invention

[Overview]

Each embodiment of the present invention relates to a method of calling wireless terminals in a wireless access network. In a conventional method of calling wireless terminals, when a specific wireless terminal is called by a wireless base station covering a plurality of wireless terminals, all the wireless terminals receive both a first broadcast signal for indicating that there is a call and a second broadcast signal for notifying all the wireless terminals of specific called wireless terminal information. Thus, the wireless terminals other than the wireless terminal to be called unnecessarily consume power by receiving the second broadcast signal.

In the embodiments of the present invention, all the wireless terminals receive the first broadcast signal, including part of ID information indicating a called wireless terminal, from the wireless base station. The called wireless terminal detects timing at which data is actually received, by receiving the second broadcast signal from the wireless base station. On the other hand, the wireless terminals other than the called wireless terminals do not receive the second broadcast signal. Accordingly, it is possible to reduce power consumption in the wireless terminals. In the embodiments of the present invention, a structure of the first broadcast signal in which an area storing the called wireless terminal information is fixed or variable will be described.

More specifically, in the embodiments of the present invention, part of the ID information of a called wireless terminal is transmitted, as a call information signal transmitted through the first broadcast signal, from a wireless base station 11 to the wireless terminals 21. Call information to be transmitted includes "classification information" and "wireless terminal ID information." The classification information indicates the number of partial ID patterns included in the wireless terminal ID information, the lengths of the partial ID patterns, or information associated with the number and lengths of the partial ID patterns. The wireless terminal ID information includes partial ID patterns having part or all of wireless terminal IDs of a plurality of wireless terminals to be called. Information to be indicated is specified by the classification information. The call information has a fixed length. For this reason, the length of the partial ID pattern transmitted as the wireless terminal ID information is shortened as the number of called wireless terminals is increased.

Hereinafter, the embodiments of the present invention will be described with reference to the accompanying drawings.

[First Embodiment]

FIG. 1 is a diagram illustrating the configuration of a wireless access system according to a first embodiment of the present invention. The wireless access system according to this embodiment includes one wireless base station 11 connected to a wired network 10 and a plurality (in FIG. 1, three) of wireless terminals 21 connected to the wired network 10 via the wireless base station 11. For communication between the wireless base station 11 and the wireless terminals 21 via wireless lines 30, an access method using time division multiple access/time division duplex (TDMA/TDD) is used.

Figure 2:
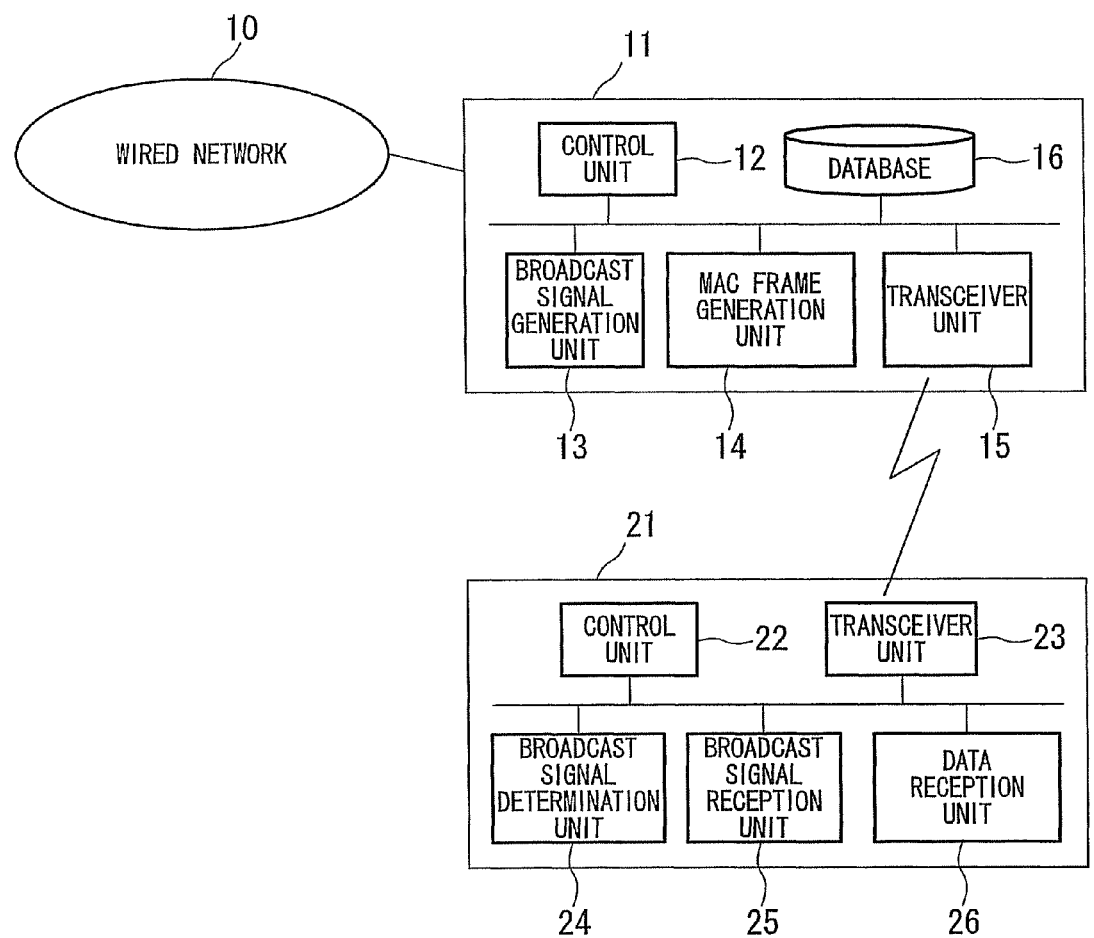
FIG. 2 is a diagram illustrating an exemplary configuration of a wireless base station and a wireless terminal in the wireless access system according to the first embodiment of the present invention.

FIG. 2 is a diagram illustrating an exemplary configuration of the wireless base station 11 and the wireless terminal 21 in the wireless access system according to the first embodiment of the present invention. In FIG. 2, only the configuration directly associated with this embodiment is shown.

In FIG. 2, a control unit 12 of the wireless base station 11 includes a central processing unit (CPU), a read-only memory (ROM), and a random access memory (RAM). The control unit 12 controls respective units of the wireless base station 11.

A broadcast signal generation unit 13 generates the first and second broadcast signals described above. The first broadcast signal includes the "classification information" and the "wireless terminal ID information (part of the wireless terminal ID)" as call information. The second broadcast signal includes assignment information for a wireless slot of call data for the wireless terminal 21.

A MAC frame generation unit 14 (also called a wireless frame generation unit) generates a MAC frame including the first broadcast signal, the second broadcast signal subsequent to the first broadcast signal, and transmission data.

A transceiver unit 15 (also called a first transceiver unit) performs wireless communication with the wireless terminal 21.

A database 16 stores, for example, the ID information of the wireless terminals 21. The structures of the first broadcast signal, the second broadcast signal, the MAC frame, and so on will be described in detail below.

A control unit 22 of the wireless terminal 21 includes a CPU, a ROM, and a RAM. The control unit 22 controls respective units of the wireless terminal 21. Based on the first broadcast signal received from the wireless base station 11, a broadcast signal determination unit 24 determines whether the second broadcast signal is received or not.

When the broadcast signal determination unit 24 determines that the second broadcast signal is received, the broadcast signal reception unit 25 receives the second broadcast signal. When the wireless slot assignment information to be transmitted to the own wireless terminal 21 is detected based on the second broadcast signal, a data reception unit 26 receives data to be transmitted to the own wireless terminal 21 transmitted from the wireless base station 11. A transceiver unit 23 (also called a second transceiver unit) performs wireless communication with the wireless base station 11.

Figure 3:
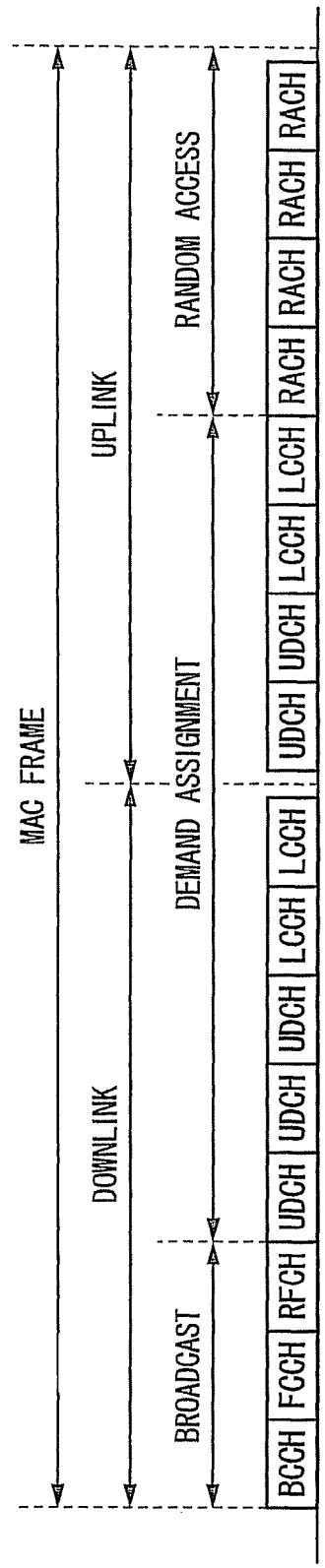
FIG. 3 is a diagram illustrating the structure of a MAC frame.

FIG. 3 is a diagram illustrating the structure of the MAC frame used in the wireless access system according to this embodiment.

The MAC frame has a fixed length. The first half of the MAC frame is a downlink directed from the wireless base station 11 to the wireless terminal 21. The second half of the MAC frame is an uplink directed from the wireless terminal 21 to the wireless base station 11.

The downlink includes a broadcast area for transmitting a broadcast signal and a demand assignment area for transmitting unicast data. A broadcast control channel (BCCH), a frame control channel (FCCH), and a random access feedback channel (RFCH) are transmitted in the broadcast area.

A user data channel (UDCH) and a link control channel (LCCH) are transmitted in the demand assignment area. The above-described broadcast slot corresponds to a BCCH and an FCCH.

A BCCH is a channel used to report common system information such as a wireless base station ID and a MAC frame number and corresponds to the first broadcast signal. An FCCH is a channel used to report information on the structure of the MAC frame and corresponds to the second broadcast signal.

In an RFCH, success or failure in random access in the previous MAC frame, a random access parameter used in the wireless terminal 21, or RA slot information is reported from the wireless base station 11 to the wireless terminal 21.

A UDCH is a channel for transmitting user data. An LCCH is a channel for transmitting control information. An RACH is a channel used for random access.

Figure 4:
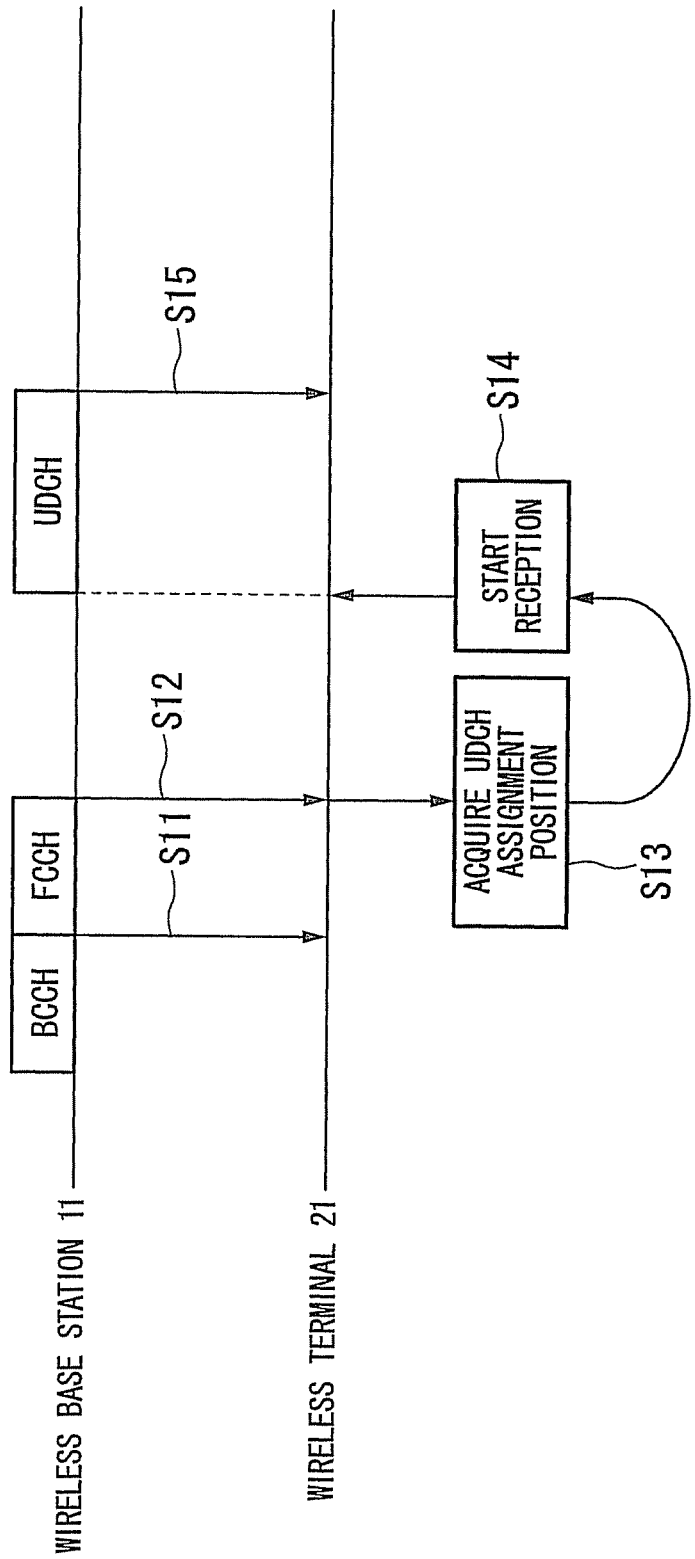
FIG. 4 is a diagram illustrating a data reception sequence in the wireless access system according to the first embodiment of the present invention.

FIG. 4 is a diagram illustrating a data reception sequence in the wireless terminal 21 according to the first embodiment of the present invention. When receiving data, the wireless terminal 21 initially receives a BCCH from the wireless base station 11 (step S11). The BCCH includes length information of an FCCH.

Based on the FCCH length information, the wireless terminal 21 receives an FCCH subsequently transmitted from the wireless base station 11 (step S12). The FCCH includes information on a transmission start position and a length of a UDCH for transmitting the user data.

When receiving an FCCH, the wireless terminal 21 acquires the information on the position of a UDCH to be transmitted to the own wireless terminal 21 (step S13) and starts reception (step S14). The wireless terminal 21 receives a UDCH at the position specified in the information acquired in step S13 from the wireless base station 11 (step S15).

In the wireless access system, when data is intermittently transmitted from the wireless base station 11 to the wireless terminal 21 and when traffic is low (when the arrival interval of data is very long for the wireless terminal 21), the wireless terminal 21 intermittently receives a BCCH to reduce power consumption in a standby state. While the wireless terminal 21 intermittently receives a BCCH, the wireless terminal 21 does not receive a BCCH of every MAC frame but receives a BCCH at a predetermined frame period. In addition, the wireless terminal 21 does not receive a BCCH of other frames from the wireless base station 21. Accordingly, the wireless terminal 21 can reduce the power consumption.

Figure 5:
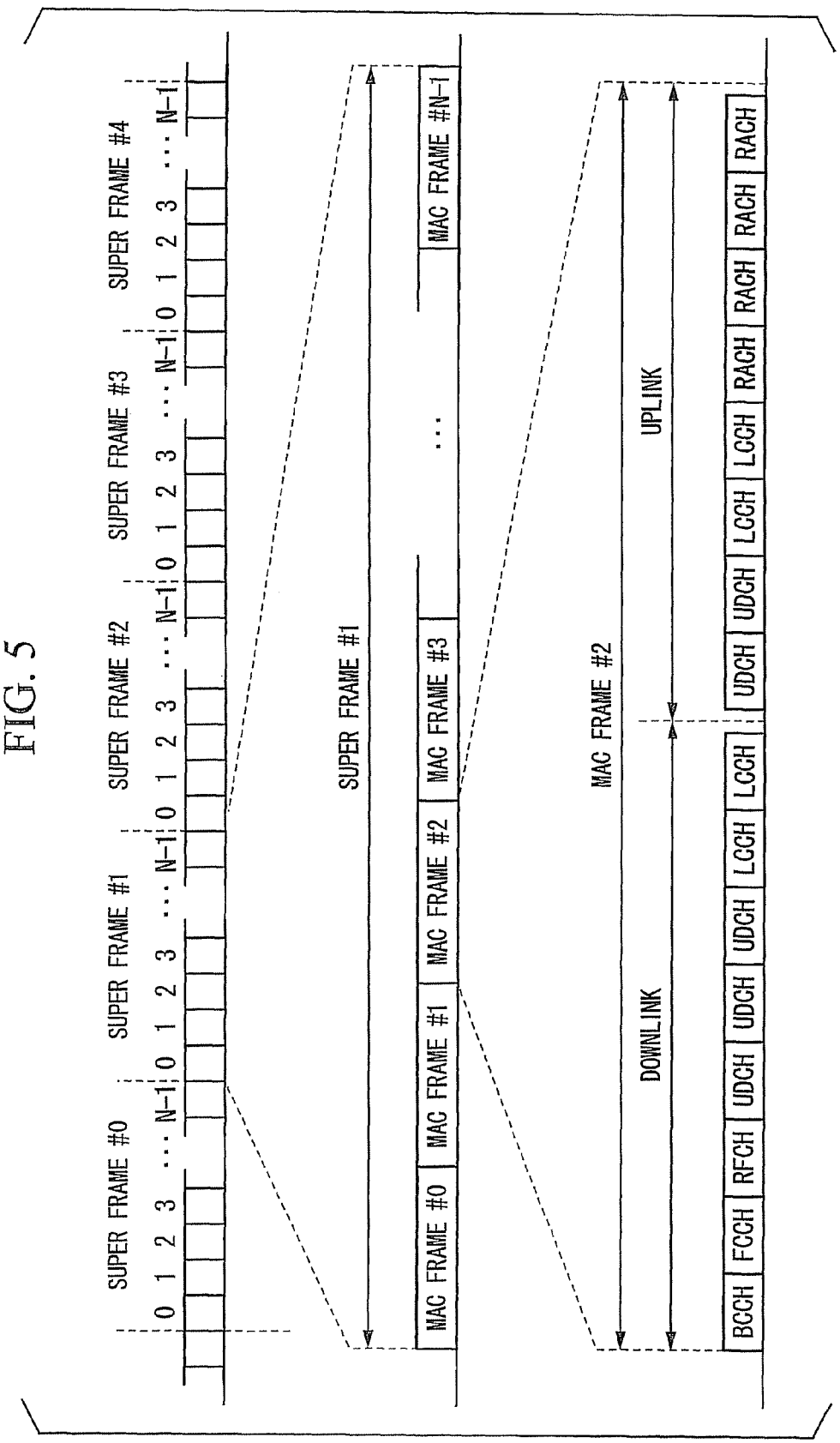
FIG. 5 is a diagram illustrating a frame structure when intermittent BCCH reception is performed.

FIG. 5 is a diagram illustrating a frame structure used for the wireless terminal 21 to intermittently receive a BCCH according to the first embodiment of the present invention.

In the frame structure when a BCCH is intermittently received, super frames #0 to #4 each include a total of N MAC frames #0 to #N−1 (upper part of FIG. 5). Frame numbers (#0 to #N−1) are assigned to the N MAC frames of one super frame sequentially from the head frame.

For example, the super frame #1 includes MAC frames #0 to #N−1 (middle part of FIG. 5). In addition, for example, the MAC frame #2 includes a downlink including a BCCH, an FCCH, an RFCH, a UDCH, a UDCH, a UDCH, an LCCH, and an LCCH and an uplink including a UDCH, a UDCH, an LCCH, an LCCH, an RACH, an RACH, an RACH, and an RACH (lower part of FIG. 5).

The wireless terminal 21 intermittently receiving a BCCH receives a BCCH of only the m-th MAC frame in a reception standby state. Here, m is an integer in the range from 0 to N−1 and may be determined in advance between the wireless base station 11 and the wireless terminal 21.

Figure 6:
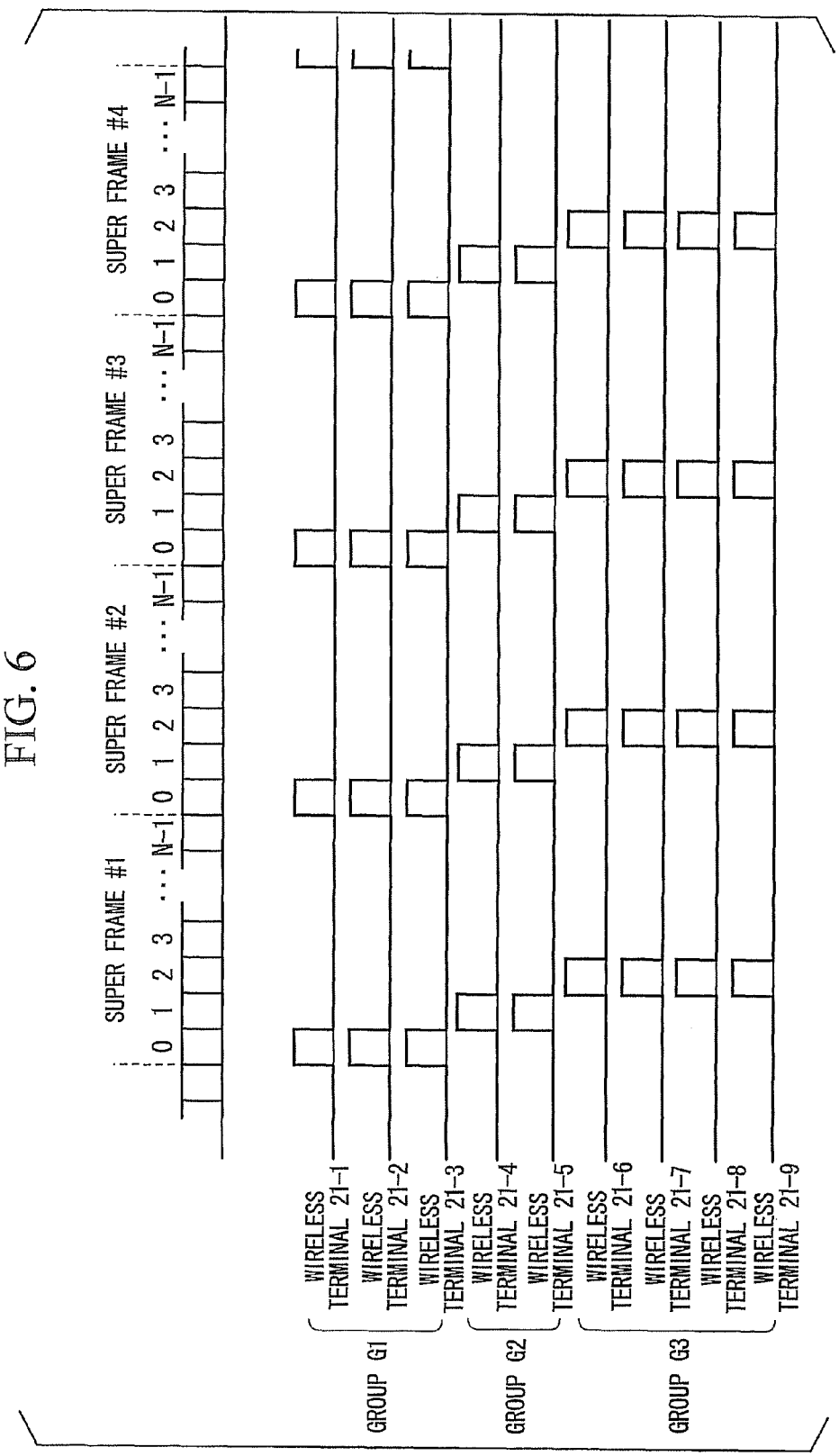
FIG. 6 is a diagram illustrating an example of intermittent BCCH reception.

FIG. 6 is a diagram illustrating an example where the wireless terminal 21 according to the first embodiment of the present invention intermittently receives a BCCH. Here, a case where the wireless base station 11 communicates with the wireless terminals 21 (wireless terminals 21-1, 21-2, 21-3, 21-4, 21-5, 21-6, 21-7, 21-8, and 21-9) will be described.

In FIG. 6, the wireless terminals 21-1, 21-2, and 21-3 belong to a group G1. The wireless terminals 21-4 and 21-5 belong to a group G2. The wireless terminals 21-6, 21-7, 21-8, and 21-9 belong to a group G3.

The wireless terminals 21-1, 21-2, and 21-3 belonging to the group G1 receive a BCCH of only the zeroth MAC frame #0 of each of the super frames #1 to #4, and do not receive a BCCH of the other MAC frames #2 to #N−1.

The wireless terminals 21-4 and 21-5 belonging to the group G2 receive a BCCH of only the first MAC frame #1 of each of the super frames #1 to #4, and do not receive a BCCH of the other MAC frames #0 and #2 to #N−1.

The wireless terminals 21-6, 21-7, 21-8, and 21-9 belonging to the group G3 receive a BCCH of only the second MAC frame #2, and do not receive a BCCH of the other MAC frames #0, #1, and #3 to #N−1.

Next, a case where data is transmitted from the wireless base station 11 to the specific wireless terminal 21 will be described with reference to FIGS. 7, 8, and 9.

When the wireless base station 11 transmits data to the wireless terminal 21-1 having received the zeroth BCCH in the reception standby state, the wireless base station 11 transmits the data in the zeroth MAC frames #0 of the super frames #1 to #4. A BCCH of the MAC frame #0 includes the "classification information" and the "wireless terminal ID information" as the call information of the wireless terminal 21. The "classification information" and the "wireless terminal ID information" will be described in detail below.

Figure 7:
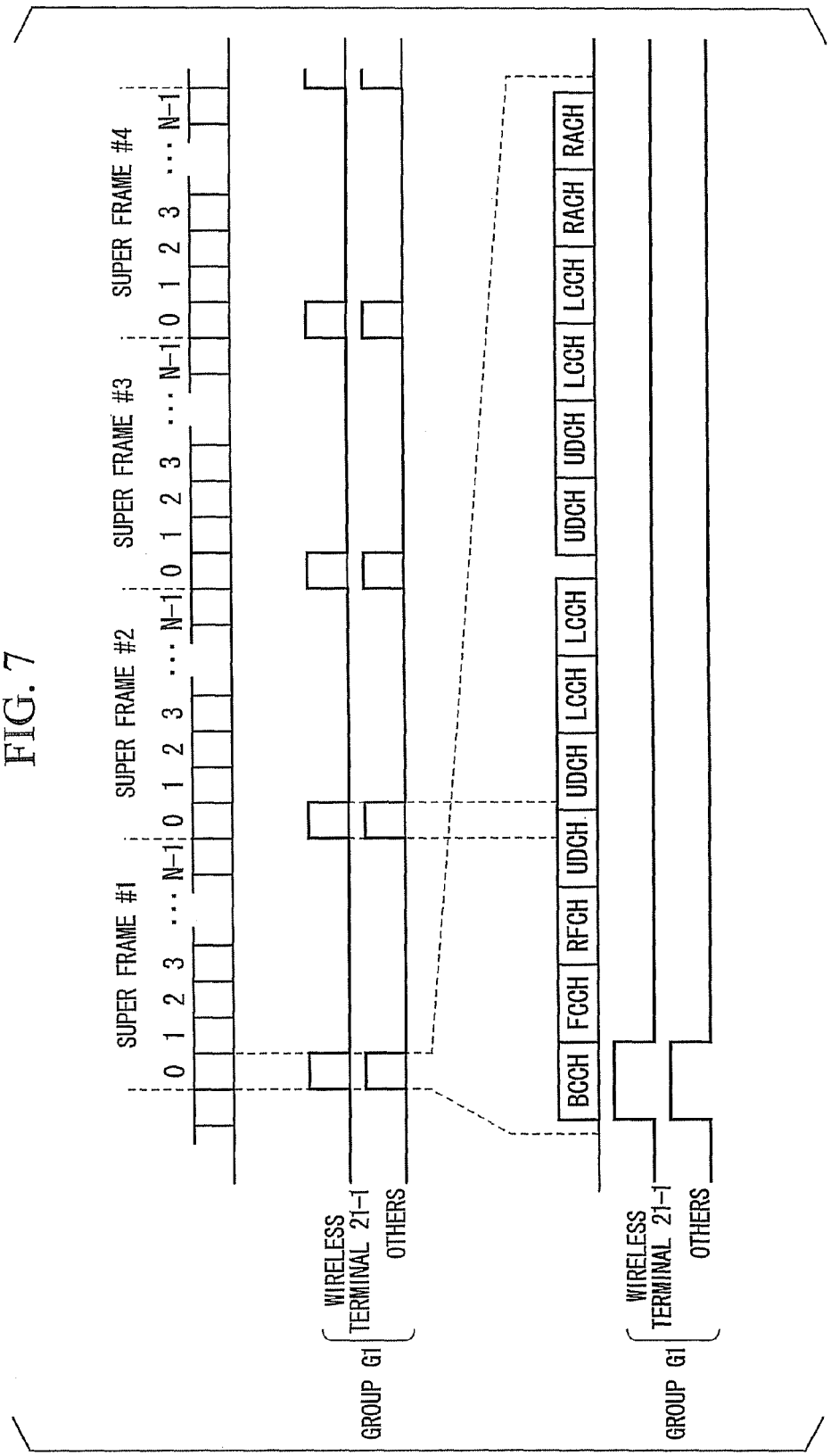
FIG. 7 is a diagram illustrating an example of data transmission (when there is no transmission data).

FIG. 7 is a diagram illustrating a reception operation of the wireless terminal 21 when there is no transmission data (when there is no call). When there is no transmission data, the "classification information" of a BCCH transmitted from the wireless base station 11 to the wireless terminal 21 indicates that there is no transmission data. Each wireless terminal 21 belonging to the group G1 including the wireless terminal 21-1 receives the zeroth MAC frame #0 of each of the super frames #1 to #4 from the wireless base station 11. This MAC frame #0 includes a BCCH, an FCCH, an RFCH, a UDCH, a UDCH, an LCCH, and an LCCH or includes a UDCH, a UDCH, an LCCH, an LCCH, an RACH, and an RACH. However, the wireless terminals 21 belonging to the group G1 including the wireless terminal 21-1 receive only a BCCH and do not receive the other channels such as an FCCH.

Figure 8:
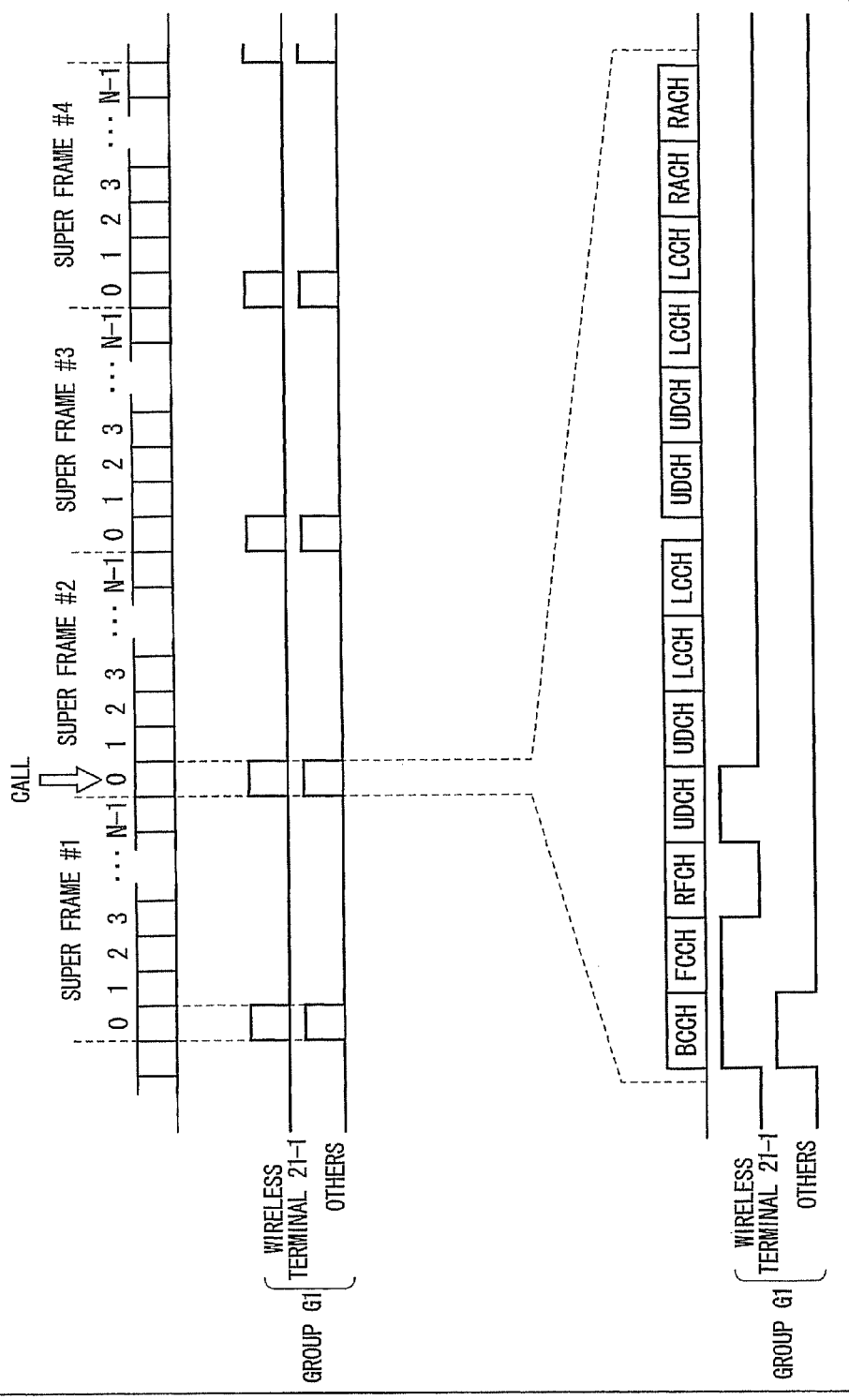
FIG. 8 is a diagram illustrating an example of data transmission (when the number of called wireless terminals is equal to or less than a constant number).

FIG. 8 is a diagram illustrating a reception operation of the wireless terminal 21 when there is transmission data (there is a call) and the number of called wireless terminals is equal to or less than a predetermined constant number. In this case, the wireless base station 11 notifies the wireless terminals 21-1, 21-2, and 21-3 belonging to the group G1 receiving the same MAC frame #0 of each of the super frames #1 to #4 that the wireless base station 11 transmits the data in the corresponding frames by means of a BCCH. In FIG. 8, a case where the wireless base station 11 transmits the data to the wireless terminal 21-1 belonging to the group G1 is shown. A case where the wireless base station 11 transmits the data in the zeroth MAC frame #0 of the super frame #2 to the wireless terminals 21-1, 21-2, and 21-3 belonging to the group G1 is also shown.

The "classification information" indicates that the transmission data is present and the number of called wireless terminals is equal to or less than the constant number.

Each wireless terminal receives a BCCH from the wireless base station 11. Then, each wireless terminal 21 confirms whether the wireless terminal ID (part of the wireless terminal ID) of the own wireless terminal is included in a call information field of a BCCH or not. When confirming that the wireless terminal ID (part of the wireless terminal ID) of the own wireless terminal is included, the wireless terminal (the wireless terminal 21-1 in FIG. 8) receives an FCCH subsequently transmitted from the wireless base station 11. The wireless terminal 21-1 having confirmed the assignment for the own wireless terminal based on an FCCH receives a UDCH from the wireless base station 11 to receive the data.

On the other hand, when confirming that the wireless terminal ID (part of the wireless terminal ID) of the own wireless terminal is not included in the call information field of a BCCH, the wireless terminals (the wireless terminals other than the wireless terminal 21-1 among the wireless terminals belonging to the group G1 in FIG. 8) receive only a BCCH and do not receive an FCCH and a UDCH from the wireless base station 11.

Figure 9:
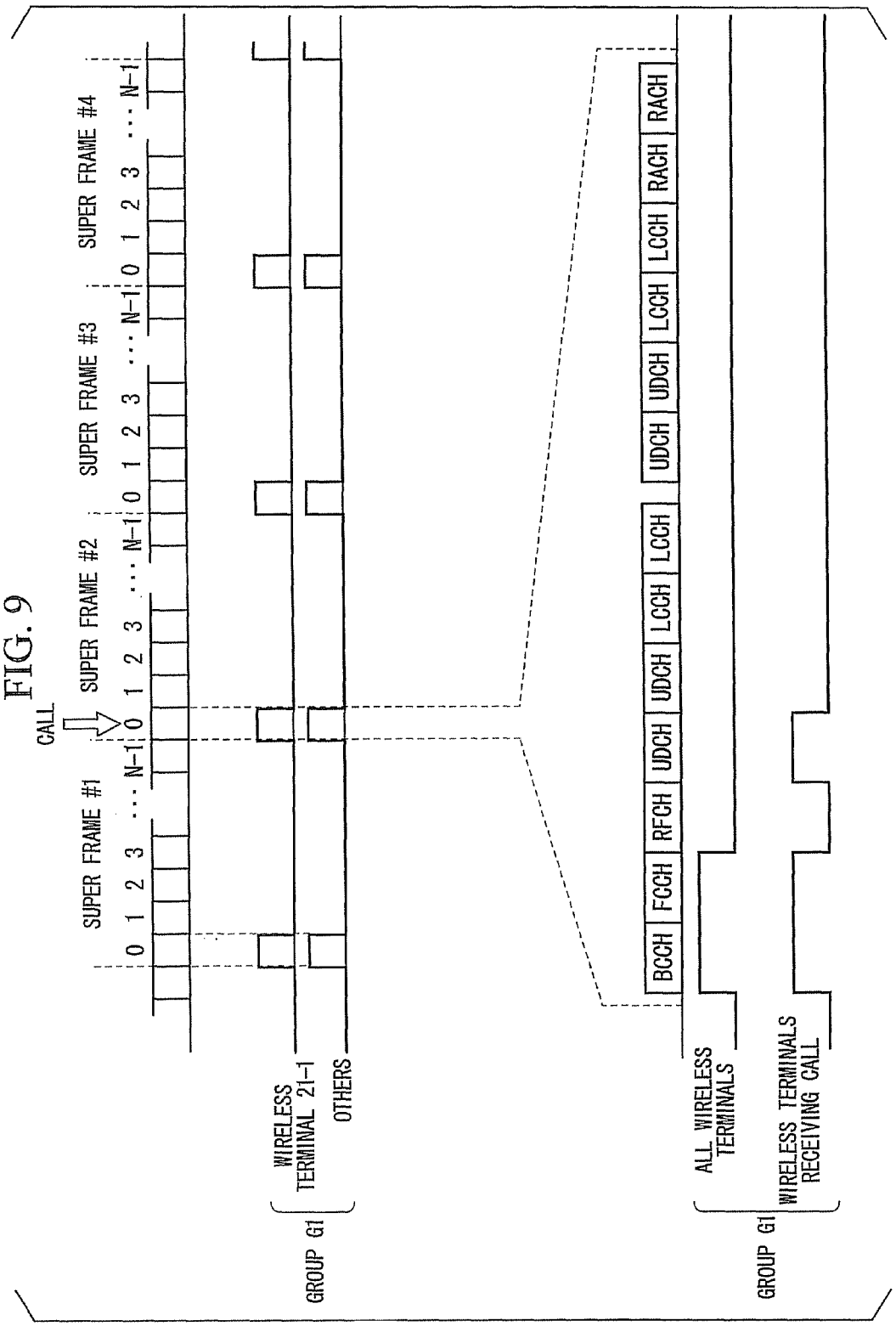
FIG. 9 is a diagram illustrating an example of data transmission (when the number of called wireless terminals is equal to or greater than the constant number).

FIG. 9 is a diagram illustrating a reception operation of the wireless terminal 21 when there is transmission data (there is a call) and the number of called wireless terminals is equal to or greater than the constant number. In this case, the wireless base station 11 notifies the wireless terminals 21-1, 21-2, and 21-3 belonging to the group G1 receiving the same MAC frame (the zeroth MAC frame in FIG. 9) that the wireless base station 11 transmits the data in the corresponding frames by means of a BCCH. In FIG. 9, the wireless base station 11 transmits the data in the zeroth MAC frame of the super frame #2 to the wireless terminals 21 belonging to the group G1. The "classification information" indicates that there is transmission data and that the number of called wireless terminals is equal to or greater than the constant number.

In this case, the wireless terminals 21-1, 21-2, and 21-3 belonging to the group G1 receive an FCCH subsequent to a BCCH from the wireless base station 11 to confirm whether a UDCH to be transmitted to the own wireless terminals 21 has not been assigned or not. When it is confirmed from an FCCH that a UDCH to be transmitted to the own wireless terminals 21 has been assigned, the wireless terminals 21 (the wireless terminals 21 called from the wireless base station 11) confirm the assignment for the own wireless terminals 21 from an FCCH, receive a UDCH, and receive the data from the wireless base station 11.

As shown in FIG. 9, the wireless terminals 21-1, 21-2, and 21-3 belonging to the group G1 receive the zeroth MAC frame of each of the super frames #1 to #4.

The wireless terminal 21-1 belonging to the group G1 receives a BCCH and an FCCH of the zeroth MAC frame.

The wireless terminals 21 called from the wireless base station 11 among the wireless terminals 21 belonging to the group G1 receive not only a BCCH and an FCCH but also a UDCH.

Figure 10:
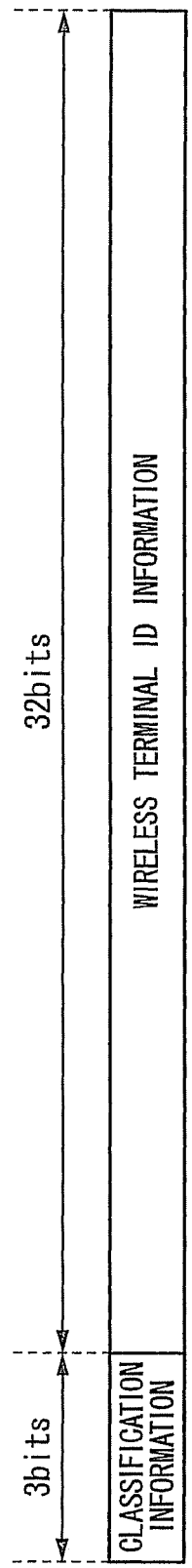
FIG. 10 is a diagram illustrating an exemplary format of a call information field.

FIG. 10 is a diagram illustrating an exemplary format of the call information field transmitted in a BCCH.

The call information includes classification information and wireless terminal ID information. The wireless terminal ID information includes information on a wireless terminal ID. The information on the wireless terminal ID includes a plurality of partial ID patterns. The partial ID pattern is a bit pattern indicating part or all of the wireless terminal ID of the wireless terminal 21 to be called.

The classification information includes the number of partial ID patterns included in the wireless terminal ID information, the lengths of the partial ID patterns, or information associated with the number and length of the partial ID patterns.

In the format of the call information field shown in FIG. 10, the length of the classification information is fixed to 3 bits and the length of the wireless terminal ID information is fixed to 32 bits.

Figure 11:
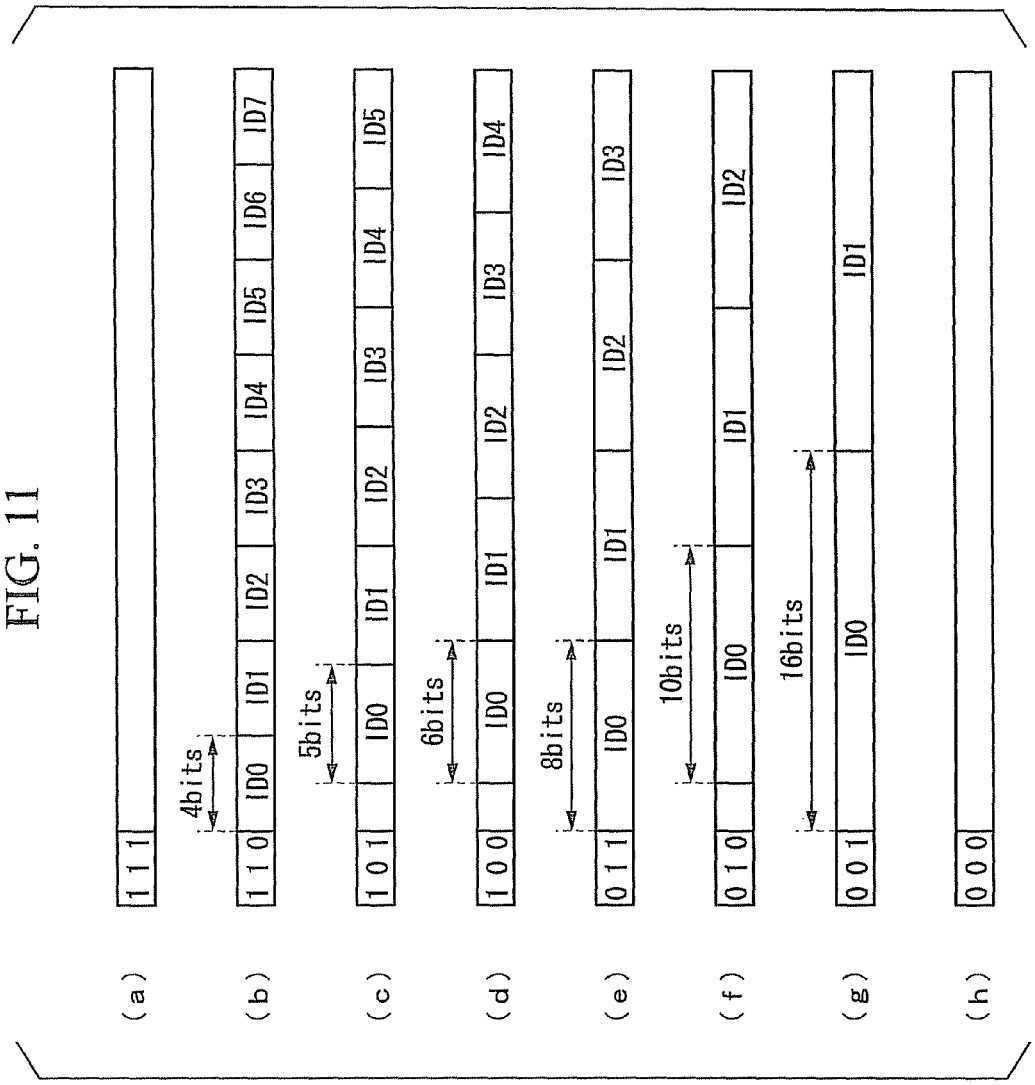
FIG. 11 is a diagram illustrating exemplary information patterns of the call information.

FIG. 11 is a diagram illustrating information patterns of the call information when the call formation format shown in FIG. 10 is used.

Part (a) of FIG. 11 shows an information pattern of the call information in which the partial ID pattern is set to 4 bits and the number of partial ID patterns is equal to or greater than 9. In part (a) of FIG. 11, the classification information is 111.

Part (b) of FIG. 11 shows an information pattern of the call information in which the number of partial ID patterns is 8. In part (b) of FIG. 11, the classification information is 110 and 4-bit partial ID patterns ID0, ID1, ID2, ID3, ID4, ID5, ID6, and ID7 are included.

Part (c) of FIG. 11 shows an information pattern of the call information in which the number of partial ID patterns is 6. In part (c) of FIG. 11, the classification information is 101 and 5-bit partial ID patterns ID0, ID1, ID2, ID3, ID4, and ID5 are included.

Part (d) of FIG. 11 shows an information pattern of the call information in which the number of partial ID patterns is 5. In part (d) of FIG. 11, the classification information is 100 and 6-bit partial ID patterns ID0, ID1, ID2, ID3, ID4, and ID5 are included.

Part (e) of FIG. 11 shows an information pattern of the call information in which the number of partial ID patterns is 4. In part (e) of FIG. 11, the classification information is 011 and 8-bit partial ID patterns ID0, ID1, ID2, and ID3 are included.

Part (f) of FIG. 11 shows an information pattern of the call information in which the number of partial ID patterns is 3. In part (f) of FIG. 11, the classification information is 010 and 10-bit partial ID patterns ID0, ID1, and ID2 are included.

Part (g) of FIG. 11 shows an information pattern of the call information in which the number of partial ID patterns is 2. In part (g) of FIG. 11, the classification information is 001 and 16-bit partial ID patterns ID0 and ID1 are included.

Part (h) of FIG. 11 shows an information pattern when there is not called terminal. In part (h) of FIG. 11, the classification information is 000.

As shown in parts (a) to (h) of FIG. 11, the classification information of the call information depends on the number of partial ID patterns included in the wireless terminal ID information.

In FIG. 11, the number of partial ID patterns constituting one wireless terminal ID information is one of seven numerals of 0, 2, 3, 4, 5, 6, and 8.

In FIG. 11, the length of the wireless terminal ID information is fixed to 32 bits. Therefore, when the number of partial ID patterns is 2 (part (g) of FIG. 11), the bit length of the partial ID pattern included in the wireless terminal ID information is 16 bits.

When the number of partial ID patterns is 3 (part (f) of FIG. 11), the bit length of the partial ID pattern included in the wireless terminal ID information is 10 bits.

When the number of partial ID patterns is 4 (part (e) of FIG. 11), the bit length of the partial ID pattern included in the wireless terminal ID information is 8 bits.

When the number of partial ID patterns is 5 (part (d) of FIG. 11), the bit length of the partial ID pattern included in the wireless terminal ID information is 6 bits.

When the number of partial ID patterns is 6 (part (c) of FIG. 11), the bit length of the partial ID pattern included in the wireless terminal ID information is 5 bits.

When the number of partial ID patterns is 8 (part (b) of FIG. 11), the bit length of the partial ID pattern included in the wireless terminal ID information is 4 bits.

The number and lengths of the partial ID patterns of the wireless terminal ID information are determined in the wireless base station 11.

Hereinafter, a method of determining the number and length of the partial ID patterns of the wireless terminal ID information will be described.

Here, a case where a wireless system capable of covering up to 65535 wireless terminals 21 with one wireless base station 11 is used will be described. A case where the wireless terminal ID (MAC-ID) is set to 16 bits to assign unique wireless terminal IDs to the wireless terminals 21 will also be described.

When the call information is generated using the patterns shown in FIG. 11, the wireless base station 11 extracts 16 bits from the wireless terminal ID of each wireless terminal 21 to be called. Accordingly, the wireless base station 11 generates 16-bit patterns corresponding in number to the called wireless terminals.

When the partial ID pattern has 16 bits, the MAC-ID length of the used system is 16 bits and thus the MAC-ID is set as the partial ID pattern.

When the number of generated bit patterns is two or less, that is, only when the number of called wireless terminals is two or less, the number of partial ID patterns included in the wireless terminal ID information is set to two and the length of each partial ID pattern is set to 16 bits.

When the number of bit patterns is equal to or greater than 3, that is, when the called wireless terminal number is equal to or greater than 3, the following process is performed.

When the number of bit patterns generated by extracting 16 bits is equal to or greater than 3, the wireless base station 11 extracts 10 bits from the wireless terminal ID of the wireless terminal 21 to be called. Accordingly, the wireless base station 11 generates the 10-bit patterns corresponding in number to the called wireless terminals. A rule determined in advance between the wireless base station 11 and the wireless terminals 21 is used to determine which bits are extracted from the wireless terminal ID. When there are a plurality of the same bit patterns among the generated bit patterns, one of the same bit patterns remains and the others are deleted (bit pattern deletion process).

Figure 12:
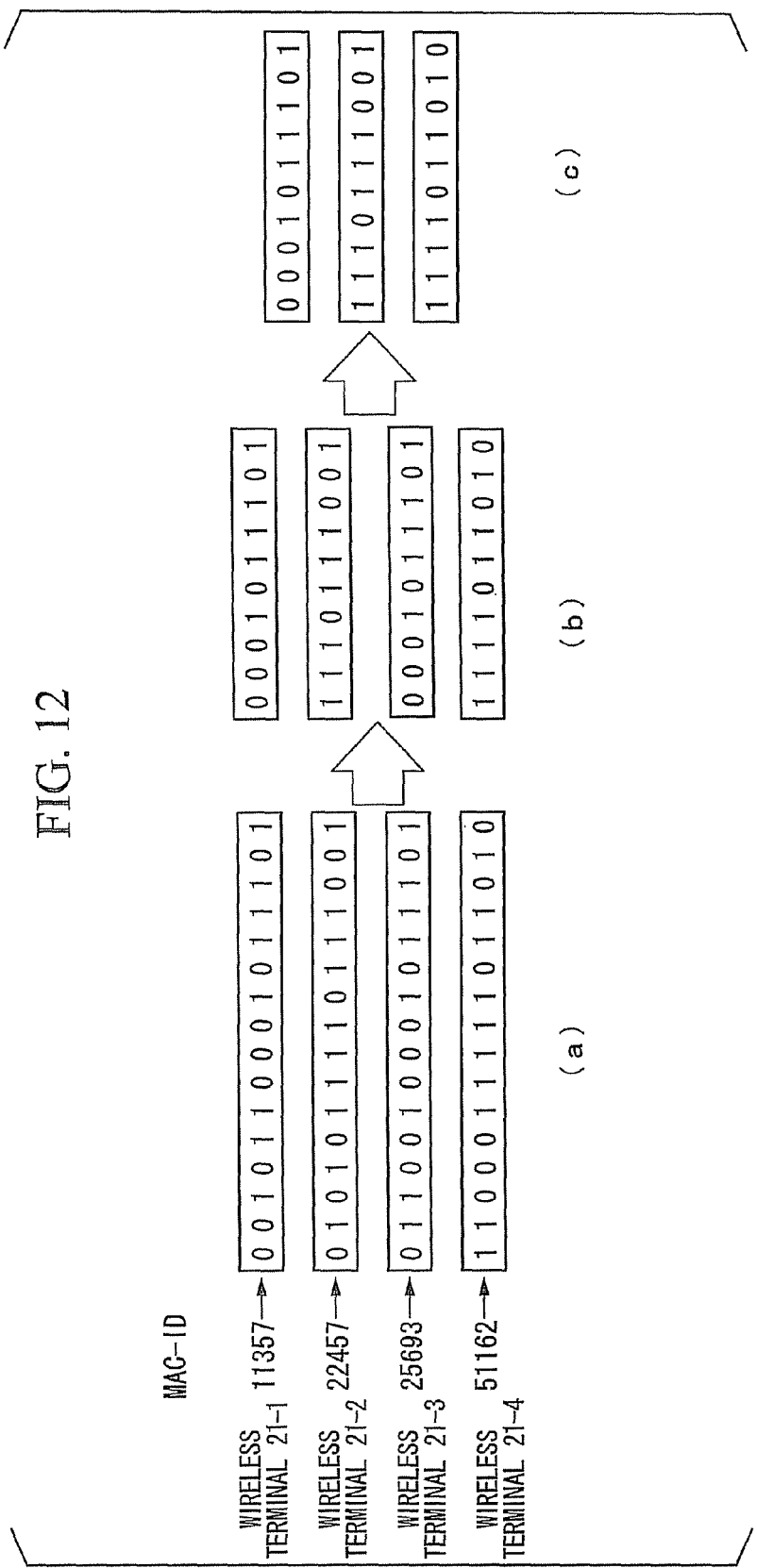
FIG. 12 is a diagram illustrating an example in which information classification is 010 and a called wireless terminal number is 4.

FIG. 12 is a diagram illustrating an example of the bit pattern deletion process. Here, a case where a total of four wireless terminals 21, for example, the wireless terminals 21-1, 21-2, 21-3, and 21-4, are called will be described. MAC-IDs of the wireless terminals 21-1, 21-2, 21-3, and 21-4 are 11357, 22457, 25693, and 51162, respectively. Using a binary number representation, the MAC-IDs can be represented as 0010110001011101, 0101011110111001, 0110010001011101, and 1100011111011010 (part (a) of FIG. 12).

Here, when the wireless base station 11 extracts a lower 10 bits from the wireless terminal IDs, four 10-bit patterns of 0001011101, 1110111001, 0001011101, and 1111011010 are generated (part (b) of FIG. 12).

In terms of the generated bit patterns, the wireless terminal 21-1 with "MAC-ID=11357" and the wireless terminal 21-3 with "MAC-ID=25693" have the same pattern. Accordingly, three patterns suffice for the ID information used to call the wireless terminals and one of the same bit patterns is deleted. Therefore, the three bit patterns of 0001011101, 1110111001, and 1111011010 need to be ultimately transmitted (part (c) of FIG. 12).

Only when the number of bit patterns remaining after the bit pattern deletion process is three or less, the number of partial ID patterns constituting the wireless terminal ID information is set to three and the length of each partial ID pattern is set to 10 bits. Here, while the number of called wireless terminals is four, the number of bit patterns to be transmitted is three. Accordingly, the partial ID pattern having a length of 10 bits (part (f) of FIG. 11) is used.

When the number of bit patterns is equal to or greater than 4, the following process is performed.

When the number of bit patterns generated by extracting 10 bits is equal to or greater than 4, the wireless base station 11 extracts 8 bits from the wireless terminal IDs of the wireless terminals 21 to be called. Accordingly, the wireless base station 11 generates 8-bit patterns corresponding in number to the called wireless terminals. A rule determined in advance between the wireless base station 11 and the wireless terminals 21 is used to determine which bits are extracted from the wireless terminal ID. When there are a plurality of the same bit patterns among the generated bit patterns, one of the same bit patterns remains and the others are deleted (bit pattern deletion process).

Only when the number of bit patterns subjected to the bit pattern deletion process is four or less, the number of partial ID patterns included in the wireless terminal ID information is set to four and the length of each partial ID pattern is set to 8 bits.

When the number of bit patterns is equal to or greater than 5, the following process is performed.

When the number of bit patterns generated by extracting 8 bits is equal to or greater than 5, the wireless base station 11 extracts 6 bits from the wireless terminal ID of each wireless terminal 21 to be called. Accordingly, the wireless base station 11 generates the 6-bit patterns corresponding in number to the called wireless terminals. A rule determined in advance between the wireless base station 11 and the wireless terminals 21 is used to determine which bits are extracted from the wireless terminal ID. When there are a plurality of the same bit patterns among the generated bit patterns, one of the same bit patterns remains and the others are deleted (bit pattern deletion process).

Only when the number of bit patterns subjected to the bit pattern deletion process is five or less, the number of partial ID patterns included in the wireless terminal ID information is set to five and the length of each partial ID pattern is set to 6 bits.

When the number of bit patterns is equal to or greater than 6, the following process is performed.

When the number of bit patterns generated by extracting 6 bits is equal to or greater than 6, the wireless base station 11 extracts 5 bits from the wireless terminal ID of each wireless terminal 21 to be called. Accordingly, the wireless base station 11 generates the 5-bit patterns corresponding in number to the called wireless terminals. A rule determined in advance between the wireless base station 11 and the wireless terminals 21 is used to determine which bits are extracted from the wireless terminal ID. When there are a plurality of the same bit patterns among the generated bit patterns, one of the same bit patterns remains and the others are deleted (bit pattern deletion process).

Only when the number of bit patterns subjected to the bit pattern deletion process is six or less, the number of partial ID patterns included in the wireless terminal ID information is set to six and the length of each partial ID pattern is set to 5 bits.

When the number of bit patterns is equal to or greater than 7, the following process is performed.

When the number of bit patterns generated by extracting 5 bits is equal to or greater than 7, the wireless base station 11 extracts 4 bits from the wireless terminal ID of each wireless terminal 21 to be called. Accordingly, the wireless base station 11 generates 4-bit patterns corresponding in number to the called wireless terminals. A rule determined in advance between the wireless base station 11 and the wireless terminals 21 is used to determine which bits are extracted from the wireless terminal ID. When there are a plurality of the same bit patterns among the generated bit patterns, one of the same bit patterns remains and the others are deleted (bit pattern deletion process).

Only when the number of bit patterns subjected to the bit pattern deletion process is eight or less, the number of partial ID patterns included in the wireless terminal ID information is set to eight and the length of each partial ID pattern is set to 4 bits.

When the number of bit patterns is equal to or greater than 9, the following process is performed.

When the number of bit patterns generated by extracting 4 bits is equal to or greater than 9, call information indicating "call of all terminals" (part (a) of FIG. 11) is used.

When there is not called wireless terminal, the classification information is set to 000 (binary number representation) and the wireless terminals 21 are notified that no data is transmitted in the MAC frame (part (h) of FIG. 11).

When wireless terminal ID information including two partial ID patterns, each having a length of 16 bits, is used, the classification information is set to 001. 16 bits of the wireless terminal IDs of the wireless terminals 21 to be called are set as the partial ID patterns constituting the wireless terminal ID information.

When a wireless system capable of covering up to 65535 wireless terminals 21 with one wireless base station 11 is used, a unique wireless terminal ID is assigned to each wireless terminal 21. Therefore, the wireless terminal ID (MAC-ID) needs to have a 16-bit length. Here, when the wireless terminal ID (MAC-ID) is set to 16 bits and 16 bits is selected as the length of the partial ID pattern, the MAC-ID is set as the partial ID pattern.

The wireless terminal 21 having received a BCCH compares the MAC-ID of the own wireless terminal 21 to the MAC-ID included in the wireless terminal ID information. When the MAC-IDs are identical to each other, the wireless terminal 21 receives an FCCH from the wireless base station 11. Then, the wireless terminal 21 receives a UDCH from the wireless base station 11 to receive data.

When the number of wireless terminals 21 to be called is 1, the same wireless terminal ID (MAC-ID) is set as both of the partial ID patterns ID0 and ID1 in part (g) of FIG. 11.

When wireless terminal ID information including three partial ID patterns, each having a length of 10 bits, is used, the classification information is set to 010. 10 bits of the wireless terminal IDs of the wireless terminals 21 to be called are set as the partial ID patterns constituting the wireless terminal ID information. The set bits of the wireless terminal ID depend on a rule determined in advance between the wireless base station 11 and the wireless terminal 21.

In setting some bits of the wireless terminal ID in the partial ID patterns, bit pattern deletion process is performed on the plurality of bit patterns extracted from the wireless terminal IDs of the wireless terminals 21 to be called. As a consequence, when the number of bit patterns is three or less, either one of the bit patterns finally remaining among the extracted bit patterns is set as the plurality of partial ID patterns of the wireless terminal ID information. For example, when four wireless terminals 21 are called and the bit patterns extracted from the respective wireless terminal IDs are A and B after the bit pattern deletion process, A is set as the partial ID pattern ID0 in part (f) of FIG. 11, B is set as the ID1, and A or B is set as the remaining ID2.

When wireless terminal ID information including four partial ID patterns, each having a length of 8 bits, is used, the classification information is set to 011. 8 bits of the wireless terminal IDs of the wireless terminals 21 to be called are set as the partial ID patterns constituting the wireless terminal ID information. A rule determined in advance between the wireless base station 11 and the wireless terminals 21 determines which bits of the wireless terminal ID are set.

In setting some bits of the wireless terminal ID in the partial ID patterns, the bit pattern deletion process is performed on the plurality of bit patterns extracted from the wireless terminal IDs of the wireless terminals 21 to be called. As a consequence, when the number of bit patterns is four or less, either one of the bit patterns finally remaining among the extracted bit patterns is set as the plurality of partial ID patterns of the wireless terminal ID information.

When wireless terminal ID information including five partial ID patterns, each having a length of 6 bits, is used, the classification information is set to 100. 6 bits of the wireless terminal IDs of the wireless terminals 21 to be called are set as the partial ID patterns constituting the wireless terminal ID information. A rule determined in advance between the wireless base station 11 and the wireless terminals 21 determines which bits of the wireless terminal ID are set.

In setting some bits of the wireless terminal ID in the partial ID patterns, the bit pattern deletion process is performed on the plurality of bit patterns extracted from the wireless terminal IDs of the wireless terminals 21 to be called. As a consequence, when the number of bit patterns is five or less, either one of the bit patterns finally remaining among the extracted bit patterns is set as the plurality of partial ID patterns of the wireless terminal ID information.

When wireless terminal ID information including six partial ID patterns, each having a length of 5 bits, is used, the classification information is set to 100. In this case, 5 bits of the wireless terminal IDs of the wireless terminals 21 to be called are set as the partial ID patterns included in the wireless terminal ID information. A rule determined in advance between the wireless base station 11 and the wireless terminals 21 is used to determine which bits of the wireless terminal ID are set.

In setting some bits of the wireless terminal ID in the partial ID patterns, the bit pattern deletion process is performed on the plurality of bit patterns extracted from the wireless terminal IDs of the wireless terminals 21 to be called. As a consequence, when the number of bit patterns is six or less, either one of the bit patterns finally remaining among the extracted bit patterns is set as the plurality of partial ID patterns of the wireless terminal ID information.

When wireless terminal ID information including eight partial ID patterns, each having a length of 4 bits, is used, the classification information is set to 110. 4 bits of the wireless terminal IDs of the wireless terminals 21 to be called are set as the partial ID patterns constituting the wireless terminal ID information. A rule determined in advance between the wireless base station 11 and the wireless terminals 21 determines which bits of the wireless terminal ID are set.

In setting some bits of the wireless terminal ID in the partial ID patterns, the bit pattern deletion process is performed on the plurality of bit patterns extracted from the wireless terminal IDs of the wireless terminals 21 to be called. As a consequence, when the number of bit patterns is eight or less, one of the bit patterns finally remaining among the extracted bit patterns is set as the plurality of partial ID patterns of the wireless terminal ID information.

Where the number of the partial ID patterns when each partial ID pattern has a length of 4 bits is equal to or greater than 9, the classification information is set to 111. In this case, all the wireless terminals 21 having received a BCCH receive an FCCH subsequent to a BCCH from the wireless base station 11. Then, the wireless terminal 21 confirms whether a UDCH to be transmitted to the own wireless terminal 21 has not been assigned or not.

[Second Embodiment]

In the first embodiment, the case where the classification information and the wireless terminal ID information in the call information field of a BCCH have a fixed length has been described. In a second embodiment of the present invention, a case where a call information field that is a combination of the classification information and the wireless terminal ID information has a fixed length will be described. The second embodiment is the same as the first embodiment, excluding the structure of the call information.

Hereinafter, the case where the call information field that is a combination of the classification information and the wireless terminal ID information has a fixed length will be described.

Figure 13:
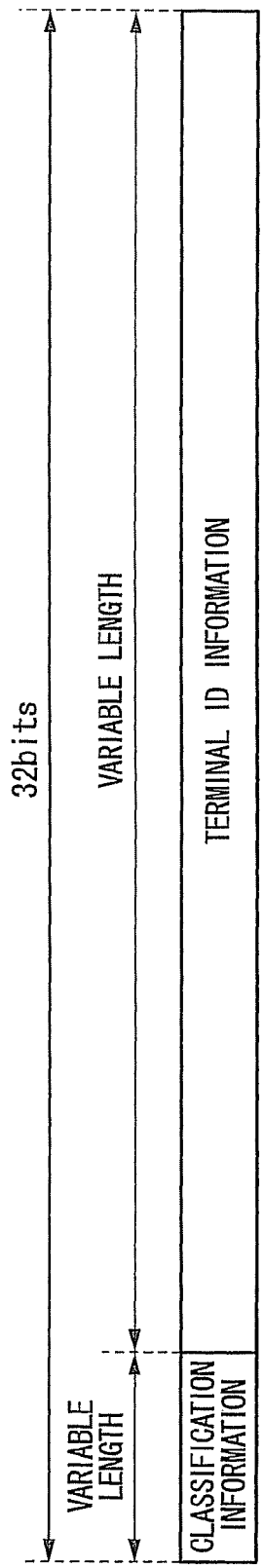
FIG. 13 is a diagram illustrating an example of the format of a call information field according to a second embodiment of the present invention.

FIG. 13 is a diagram illustrating a format of the call information field transmitted by a BCCH in the second embodiment of the present invention. The format of the call information field shown in FIG. 13 includes classification information and wireless terminal ID information, like the format of the call information field in the first embodiment shown in FIG. 10. However, the second embodiment is different from the first embodiment in that both the classification information and the wireless terminal ID information have a variable length.

Figure 14:
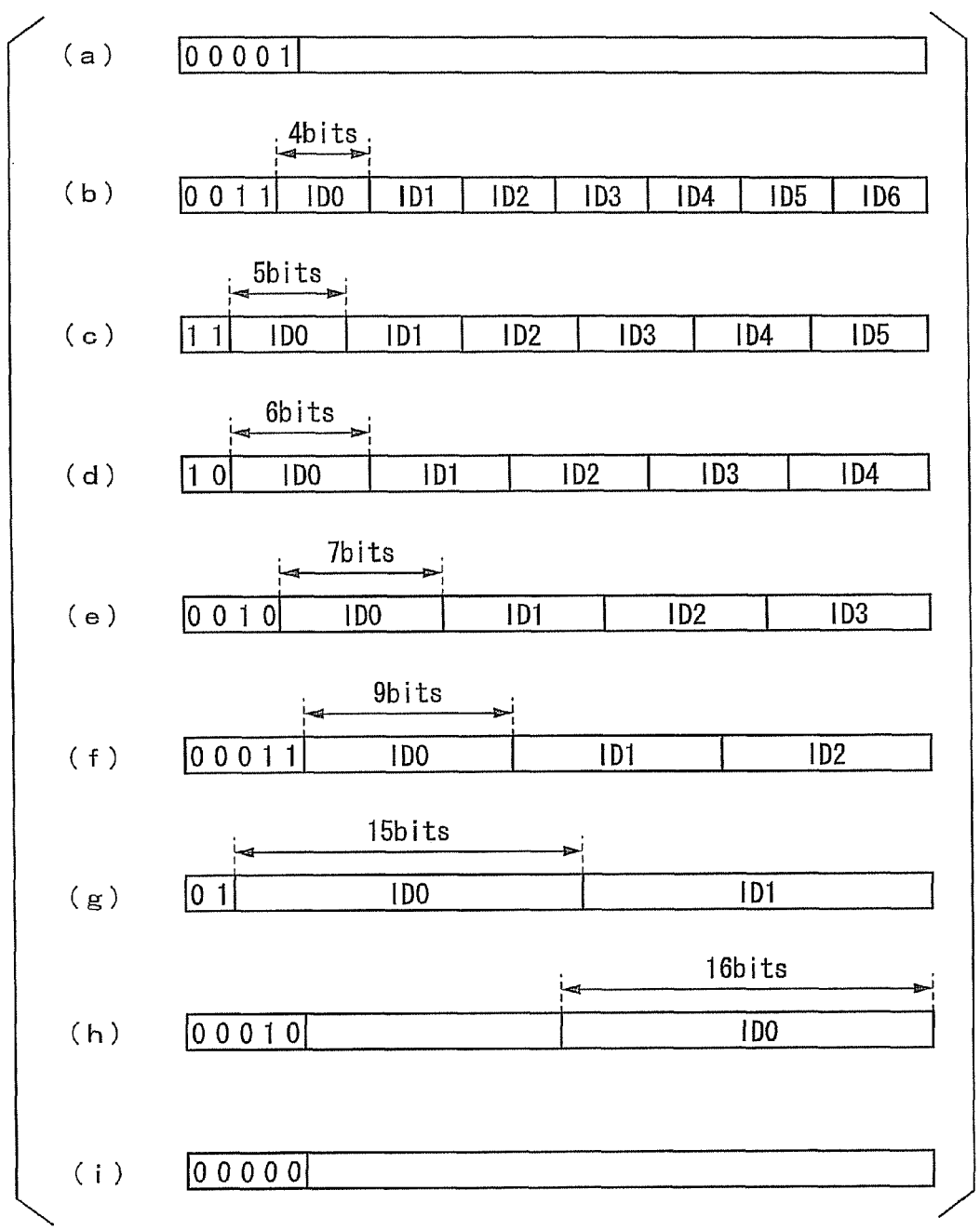
FIG. 14 is a diagram illustrating an information pattern of the call information according to the second embodiment of the present invention.

FIG. 14 is a diagram illustrating information patterns of the call information according to the second embodiment of the present invention.

Part (a) of FIG. 14 shows an information pattern of the call information in which the number of partial ID patterns when each partial ID pattern consists of 4 bits is equal to or greater than 8. In part (a) of FIG. 14, the classification information is 00001.

Part (b) of FIG. 14 shows an information pattern of the call information in which the number of partial ID patterns is 7. In part (b) of FIG. 14, the classification information is 0011 and 4-bit partial ID patterns ID0, ID1, ID2, ID3, ID4, ID5, and ID6 are included.

Part (c) of FIG. 14 shows an information pattern of the call information in which the number of partial ID patterns is 6. In part (c) of FIG. 14, the classification information is 11 and 5-bit partial ID patterns ID0, ID1, ID2, ID3, ID4, and ID5 are included.

Part (d) of FIG. 14 shows an information pattern of the call information in which the number of partial ID patterns is 5. In part (d) of FIG. 14, the classification information is 10 and 6-bit partial ID patterns ID0, ID1, ID2, ID3, and ID4 are included.

Part (e) of FIG. 14 shows an information pattern of the call information in which the number of partial ID patterns is 4. In part (e) of FIG. 14, the classification information is 0010 and 7-bit partial ID patterns ID0, ID1, ID2, and ID3 are included.

Part (f) of FIG. 14 shows an information pattern of the call information in which the number of partial ID patterns is 3. In part (f) of FIG. 14, the classification information is 00011 and 9-bit partial ID patterns ID0, ID1, and ID2 are included.

Part (g) of FIG. 14 shows an information pattern of the call information in which the number of partial ID patterns is 2. In part (g) of FIG. 14, the classification information is 01 and 15-bit partial ID patterns ID0 and ID1 are included.

Part (h) of FIG. 14 shows an information pattern of the call information in which the number of partial ID patterns is 1. In part (h) of FIG. 14, the classification information is 00010 and a 16-bit partial ID pattern ID0 is included.

Part (i) of FIG. 14 shows an information pattern in which there is not called terminal. In part (i) of FIG. 14, the classification information is 00000.

The classification information of the call information depends on the number of partial ID patterns constituting the wireless terminal ID information. An algorithm for determining the number and length of the partial ID pattern is the same as the determination method in the first embodiment shown in FIG. 10, although a different length of the partial ID pattern is used.

When the present embodiment is used, the wireless terminal 21 having received the call information does not recognize the length of the classification information in advance, and thus, initially reads a first two bits.

When the first two bits are 01, 10, or 11, the wireless terminal 21 recognizes that the number of partial ID patterns is 2, 5, or 6 and the length of the partial ID patterns is 15 bits, 8 bits, or 5 bits.

When the first two bits are 00, the wireless terminal 21 reads another two bits. When 2 bits of the third and fourth bits are 10 or 11, the wireless terminal 21 recognizes that the number of partial ID patterns is 4 or 7 and the length of the partial ID patterns is 7 bits or 4 bits.

When the 2 bits of the third and fourth bits are 01, the wireless terminal 21 reads another one bit. When this bit is 0, the number of partial ID patterns is 1 and the length of the partial ID pattern is 16 bits. On the other hand, when the bit is 1, the number of partial ID patterns is 3 and the length of each partial ID pattern is 9 bits.

When the first two bits are 00 and the third and fourth bits are 00, the wireless terminal 21 reads another one bit. When the fifth bit is 0, there is not called wireless terminal. In this case, none of the wireless terminals 21 having received a BCCH receives an FCCH subsequent to a BCCH from the wireless base station 11. On the other hand, when the fifth bit is 1 and the partial ID pattern is set to 4 bits, the number of partial ID patterns is equal to or greater than 8. In this case, all of the wireless terminals 21 having received a BCCH receive an FCCH subsequent to a BCCH to confirm whether a UDCH to be transmitted to the own wireless terminal 21 has not been assigned or not.

Each wireless terminal 21 executes the above-described process to distinguish the classification information from the wireless terminal ID information. Each wireless terminal 21 recognizes the number and length of the partial ID patterns included in the wireless terminal ID information and determines whether the partial ID pattern of the wireless terminal ID information is identical to part of the wireless terminal ID of the own wireless terminal 21 or not. When the partial ID pattern is identical to the part of the wireless terminal ID, the wireless terminal 21 receives an FCCH subsequent to a BCCH from the wireless base station 11.

As described above, in the embodiments of the present invention, the part of the wireless terminal ID is transmitted as the call information in the first broadcast signal from the wireless base station 11 to the wireless terminals 21. The call information includes the classification information and the wireless terminal ID information.

The classification information indicates the number of partial ID patterns included in the wireless terminal ID information, the lengths of the partial ID patterns, or information associated with the number and lengths of the partial ID patterns. The wireless terminal ID information indicates part of the ID of the called wireless terminal 21. The format of the call information is selected according to the number of partial ID patterns included in the wireless terminal ID information, the length of the partial ID pattern, or the number and length of the partial ID patterns. The call information has a fixed length.

When the wireless terminals 21 are divided into call groups, the wireless terminals 21 are grouped so that overlapping of the wireless terminal IDs is minimized.

Thus, the wireless terminals 21 receiving the second broadcast signal are restricted by the first broadcast signal, thereby greatly reducing the standby power consumption of the wireless terminals in the call standby state without increasing the call delay time. Therefore, a lifetime of the batteries of the wireless terminals can be lengthened.

The first broadcast signal has a fixed length irrespective of the number of the called wireless terminal 21, thereby simplifying the reception operation of the wireless terminal 21 and reducing the overhead.

Although the embodiments of the present invention have been described, the wireless access system according to the present invention is not limited to the above-described illustrated examples, but it is understood that variations may be made to the present invention without departing from the scope of the present invention.

Industrial Applicability

The present invention is applicable to a wireless terminal call method and a wireless access system capable of greatly reducing the standby power consumption of wireless terminals in a call standby state without increasing the call delay time, to lengthen a lifetime of the batteries of the wireless terminals.

The invention claimed is:

1. A wireless terminal call method in which a plurality of wireless terminals each having a unique ID share a wireless frame including a plurality of wireless slots and a wireless base station calls at least one of the plurality of the wireless terminals using a broadcast slot of the wireless frame, the wireless terminal call method comprising:
generating, by the wireless base station, a first broadcast signal and a second broadcast signal, the first broadcast signal including not all but a part of a wireless terminal ID of a wireless terminal to be called, the wireless terminal being included in the plurality of the wireless terminals, the second broadcast signal including assignment information which is information on assignment position of at least one of the plurality of the wireless slots for the wireless terminal, the at least one of the plurality of the wireless slots being included in the second broadcast signal;
generating, by the wireless base station, a wireless frame including the first broadcast signal and the second broadcast signal such that the second broadcast signal is subsequent to the first broadcast signal in the broadcast slot;
transmitting, by the wireless base station, the wireless frame to the plurality of the wireless terminals;
receiving, by the plurality of the wireless terminals, the first broadcast signal transmitted from the wireless base station;
detecting, by the plurality of the wireless terminals, whether the not all but the part of the wireless terminal ID of own wireless terminal is included in the first broadcast signal received in the broadcast signal reception or not and determining that the second broadcast signal is to be continuously received when the not all but the part of the wireless terminal ID is included; and
receiving, by the plurality of the wireless terminals, the second broadcast signal when it is determined in the broadcast signal determination that the second broadcast signal is to be received, stopping receiving data transmitted from the wireless base station when the assignment information is not included in the received second broadcast signal, and receiving the data based on the assignment information when the assignment information is included in the received second broadcast signal.

2. The wireless terminal call method according to claim 1, the wireless terminal call method further comprising:
dividing, by the wireless base station, the plurality of the wireless terminals into a plurality of groups and setting a super frame including a plurality of wireless frames;
presetting, by the wireless base station, the corresponding wireless frame from the plurality of the wireless frames in the super frame for each of the plurality of the groups, and
receiving, by the wireless terminal, the first broadcast signal or the first and second broadcast signals in the preset wireless frame.

3. The wireless terminal call method according to claim 1 or 2, wherein the first broadcast signal includes call information having a fixed length and including classification information and wireless terminal ID information,
the classification information is at least one of the number of a plurality of partial ID patterns included in the wireless terminal ID information, lengths of the plurality of the partial ID patterns, and information associated with the number and lengths of the plurality of the partial ID patterns,
the wireless terminal ID information indicates the plurality of the partial ID patterns, and
at least one of the plurality of the partial ID patterns indicates a part of the wireless terminal ID of the wireless terminal.

4. The wireless terminal call method according to claim 3, wherein the number of the at least one of the plurality of the wireless terminals is used as the classification information.

5. The wireless terminal call method according to claim 3, wherein a first length of the classification information and a second length of the wireless terminal ID information are variable.

6. The wireless terminal call method according to claim 4, wherein a bit length of one of the plurality of the partial ID patterns in the wireless terminal ID information varies with the number of the plurality of the partial ID patterns included in the wireless terminal ID information.

7. The wireless terminal call method according to claim 6, wherein ID information of the wireless terminal designated in the wireless terminal ID information is represented in a bit pattern for each of the at least one of the plurality of the wireless terminals, and the bit pattern is a bit pattern of a plurality of bits which are part of the ID of the at least one of the plurality of the wireless terminals, the bit pattern being a bit pattern corresponding to a bit length of one of the plurality of the partial ID patterns designated in the wireless terminal ID information.

8. The wireless terminal call method according to claim 6, wherein the bit length of the one of the plurality of the partial ID patterns is shortened as the number of the plurality of the partial ID patterns is increased.

9. The wireless terminal call method according to claim 7, wherein when the bit patterns of the plurality of the bits of the IDs of the at least one of the plurality of wireless terminals are common in a range of the bit length of one of the plurality of the partial ID patterns designated in the wireless terminal ID information, the wireless base station regards the at least one of the plurality of the wireless terminals having the common bit pattern as one wireless terminal to generate the wireless terminal ID information.

10. The wireless terminal call method according to claim 1, wherein the generation of the first broadcast signal is performed by extracting lower predetermined bits from the unique ID of the at least one of the plurality of the wireless terminals.

11. A wireless access system in which a plurality of wireless terminals each having a unique ID share a wireless frame including a plurality of wireless slots and a wireless base station calls at least one of the plurality of the wireless terminals using a broadcast slot of the wireless frame,
    wherein the wireless base station comprises:
    a first central processing unit to control the wireless base station;
    a database configured to store the unique ID of the plurality of the wireless terminals;
    a broadcast signal generation circuit configured to generate a first broadcast signal and a second broadcast signal, the first broadcast signal including not all but a part of a wireless terminal ID of a wireless terminal to be called, the not all but the part of the wireless terminal ID being generated based on the unique ID stored in the database, the wireless terminal being included in the plurality of the wireless terminals, the second broadcast signal including assignment information which is information on assignment position of at least one of the plurality of the wireless slots for the wireless terminal, the at least one of the plurality of the wireless slots being included in the second broadcast signal;
    a wireless frame generation circuit configured to generate a wireless frame including the first broadcast signal and the second broadcast signal generated by the broadcast signal generation circuit such that the second broadcast signal is subsequent to the first broadcast signal in the broadcast slot; and
    a first transceiver circuit configured to transmit the wireless frame generated by the wireless frame generation circuit to the plurality of the wireless terminals, and receive wireless signals transmitted from the plurality of the wireless terminals,
    wherein the database, the broadcast signal generation circuit, the wireless frame generation circuit, and the first transceiver circuit are controlled by the first central processing unit, and
    wherein each of the plurality of the wireless terminals comprises:
    a second central processing unit configured to control own wireless terminal;
    a second transceiver circuit configured to receive the first broadcast signal transmitted from the first transceiver circuit and transmit one of the wireless signals to the wireless base station;
    a broadcast signal determination circuit configured to detect whether the not all but the part of the wireless terminal ID of the own wireless terminal is included in the first broadcast signal received by the second transceiver circuit or not and determine that the second broadcast signal included in the wireless frame transmitted by the first transceiver circuit is to be continuously received when the not all but the part of the wireless terminal ID is included;
    a broadcast signal reception circuit configured to receive the second broadcast signal when the broadcast signal determination circuit determines that the second broadcast signal is to be received; and
    a data reception circuit configured to stop receiving data transmitted from the wireless base station when the assignment information is not included in the second broadcast signal received by the broadcast signal reception circuit, and receive the data based on the assignment information when the assignment information is included in the second broadcast signal received by the broadcast signal reception circuit,
    wherein the second transceiver circuit, the broadcast signal determination circuit, the broadcast signal reception circuit, and the data reception circuit are controlled by the second central processing unit.

12. A wireless base station comprises:
    a central processing unit to control the wireless base station;
    a database configured to store each unique ID of a plurality of wireless terminals;
    a broadcast signal generation circuit configured to generate a first broadcast signal and a second broadcast signal, the first broadcast signal including not all but a part of a wireless terminal ID of a wireless terminal to be called, the not all but the part of the wireless terminal ID being generated based on the unique ID stored in the database, the wireless terminal being included in the plurality of the wireless terminals, the second broadcast signal including assignment information which is information on assignment position of at least one of a plurality of wireless slots for the wireless terminal, the at least one of the plurality of the wireless slots being included in the second broadcast signal;
    a wireless frame generation circuit configured to generate a wireless frame including the first broadcast signal and the second broadcast signal generated by the broadcast signal generation circuit such that the second broadcast signal is subsequent to the first broadcast signal in the broadcast slot; and
    a transceiver circuit configured to transmit the wireless frame generated by the wireless frame generation circuit to the plurality of the wireless terminals, and receive wireless signals transmitted from the plurality of the wireless terminals,
    wherein the database, the broadcast signal generation circuit, the wireless frame generation circuit, and the transceiver circuit are controlled by the central processing unit.

13. A wireless terminal comprising:
    a central processing unit configured to control own wireless terminal;

a transceiver circuit configured to receive the first broadcast signal transmitted from the transceiver circuit and transmit a wireless signal to a wireless base station;

a broadcast signal determination circuit configured to detect whether the not all but the part of the wireless terminal ID of the own wireless terminal is included in the first broadcast signal received by the transceiver circuit or not and determine that the second broadcast signal included in a wireless frame transmitted by the wireless base station is to be continuously received when the not all but the part of the wireless terminal ID is included;

a broadcast signal reception circuit configured to receive the second broadcast signal when the broadcast signal determination circuit determines that the second broadcast signal is to be received; and a data reception circuit configured to stop receiving data transmitted from the wireless base station when assignment information is not included in the second broadcast signal received by the broadcast signal reception circuit, the assignment information being information on assignment position of at least one of a plurality of the wireless slots for the wireless terminal, the at least one of the plurality of the wireless slots being included in the second broadcast signal, and receive the data transmitted from the wireless base station to the own wireless terminal based on the assignment information when the assignment information is included in the second broadcast signal received by the broadcast signal reception circuit, wherein the transceiver circuit, the broadcast signal determination circuit, the broadcast signal reception circuit, and the data reception circuit are controlled by the central processing unit.

* * * * *